(12) United States Patent
Kuo (10) Patent No.: US 7,768,529 B2
(45) Date of Patent: Aug. 3, 2010

(54) METHOD AND SYSTEM FOR IMAGE EDITING

(75) Inventor: Lun-Chia Kuo, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 595 days.

(21) Appl. No.: 11/675,095

(22) Filed: Feb. 15, 2007

(65) Prior Publication Data

US 2008/0150946 A1 Jun. 26, 2008

(30) Foreign Application Priority Data

Dec. 22, 2006 (TW) .............................. 95148395 A (51) Int. Cl.
*G09G 5/00* (2006.01)
(52) U.S. Cl. ...................... 345/619; 345/589; 382/162; 382/171
(58) Field of Classification Search ........................ None
See application file for complete search history.

(56) References Cited

U.S. PATENT DOCUMENTS

| 5,963,254 | A | 10/1999 | Kim et al. |
| 6,580,835 | B1 | 6/2003 | Gallagher et al. |
| 7,058,128 | B1 | 6/2006 | Itokawa |
| 2005/0267690 | A1* | 12/2005 | Cong et al. ............ 702/19 |

OTHER PUBLICATIONS

Author: Kuo et al., Title: "A Flexible Architecture for Feature-Based Image Editing", Date: Mar. 2005, pp. 1179-1180.*
Author: Wang et al., Title: "Representing Images Using Points on Image Surfaces", Date: Aug. 2005, pp. 1043-1055.*
Author: Roushdy, Title: "Comparative Study of Edge Detection Algorithms Applying on the Grayscale Noisy Image Using Morphological Filter", Date: Dec. 2006, pp. 17-23.*
Author: van Beek, Title: "Edge-Based Image Representation", Date: 1995, pp. 1-10.*
"Adaptive Unsharp Masking for Contrast Enhancement", A. Polesel, G. Ramponi and V.J. Mathews, IEEE [267-270], 1997.
"Adaptive Image Contrast Enhancement Using Generalizations of Histogram Equalization", J. Alex Stark, IEEE Transactions on Image Processing , vol. 9, No. 5 [889-896], May 2000.
"Intelligent Scissors for Image Composition", E. Mortensen and W. Barrett, Proc. Siggraph [191-198], 1995.
"Perceptually-Supported Image Editing of Text and Graphics", E. Saund, D. Fleet, D. Larner, and J. Mahoney, Proc. USIT [183-192], 2003.
"Representing Image Using Points on Image Surface" Sheng-Jyh Wang, Member, IEEE, Lun-Chia Kuo, Hsin-Haw Jong, and Zong-Han Wu, IEEE Transactions on Image Processing, vol. 14, No. 8, Aug. 2005.
"Image Editing in the Contour Domain", James H. Elder, Member, IEEE, and Richard M. Goldberg, IEEE Transctions on Pattern Analysis and Machine Intelligence, vol. 3, Mar. 2001.

* cited by examiner

*Primary Examiner*—Kee M Tung
*Assistant Examiner*—David Chu
(74) *Attorney, Agent, or Firm*—Jianq Chyun IP Office (57) ABSTRACT

A method and a system for image editing are provided. The method includes the following steps: firstly, search for characteristic curves of an image; next, approximate the characteristic curves with spline functions; then, when editing the image, manipulate the characteristic curves through control points of the corresponding spline functions; and then, reconstruct the image according to the manipulated characteristic curves.

11 Claims, 12 Drawing Sheets

METHOD AND SYSTEM FOR IMAGE EDITING

CROSS-REFERENCE TO RELATED APPLICATION

This application claims the priority benefit of Taiwan application serial no. 95148395, filed Dec. 22, 2006. All disclosure of the Taiwan application is incorporated herein by reference.

BACKGROUND OF THE INVENTION

1. Field of the Invention

The present invention relates to a method and a system for image editing. More particularly, the present invention relates to a feature-based method and system for image editing.

2. Description of Related Art

Currently, image capturing devices such as digital cameras are very popular, and accordingly, the digital image editing technology has drawn more and more attention. Any manipulation on an image can be referred as editing, for example, changing the brightness or sharpness of the entire image, or adjusting the shape or color of a certain object in the image. Common image editing methods are classified into two types, namely, the pixel-based process and the object-based process, which both have their own defects.

The famous image editing software, Adobe Photoshop, and two image compression standards, including JPEG (Joint Photographic Experts Group) and JPEG 2000 are all grouped into the pixel-based image editing. This technology uses separate pixels as the subject for editing, so its disadvantage lies in that, it is difficult to edit an object in an image as a whole.

The object-based image editing has a precondition of completely defining all objects in an image before the operation. Currently, there are two methods for defining the objects. The first one is segmentation, which segments pixels of the image into objects. However, this method is technically immature, and it is difficult for being automated. The second one is to search from pixels according to a preset object model, for example, searching for a part similar to a human face from the pixels according to a face model. The problem of this method lies in that, the types of the preset object models are limited, which cannot cover all the object models applicable for all combinations and variations, and this method is difficult to be used precisely, and difficult to be automated. If the object is hard to be defined automatically, it is difficult to achieve through the way of object-based image editing.

To sum up, currently, no desirable technical scheme is available in manipulating and editing objects in an image.

SUMMARY OF THE INVENTION

The present invention provides a method for image editing, which is feature-based, for manipulating and editing objects in the image. The method is not only easy to be automated, but also has an extensive application flexibility.

Examples of the present invention may provide a system of image editing, in which a user can edit an image according to control points and parameters of characteristic curves of an image. The system is easy to operate, easy to manipulate objects and areas in the image, and has extensive application flexibility.

The present invention provides a method for image editing, which includes the following steps: firstly, search for characteristic curves of an image; next, approximate the characteristic curves with spline functions; then, when editing an image, manipulate the characteristic curves through control points of the corresponding spline functions, and then, reconstruct the image according to the manipulated characteristic curves.

Examples of the present invention may provide a system for image editing, which includes a source device and a processor. The source device provides original image data of an image. The processor searches for characteristic curves of the image, approximates the characteristic curves with spline functions, manipulates at least one of the characteristic curves through control points of the corresponding spline functions, and then, reconstructs the image according to the characteristic curves of the image.

According to the description on the embodiment of the present invention, the method and system for image editing automatically search for the characteristic curves in the image, for example, edge curves for defining edges of an object, and then, edit the image through the control points of the characteristic curves. Therefore, the objects in the image can be easily manipulated through using the above method and system. Moreover, the above method and system are easy to be automated, and have extensive application flexibility.

In order to make the aforementioned features and advantages of the present invention comprehensible, an embodiment accompanied with the drawings is described in detail below.

DESCRIPTION OF EMBODIMENTS

Figure 1:
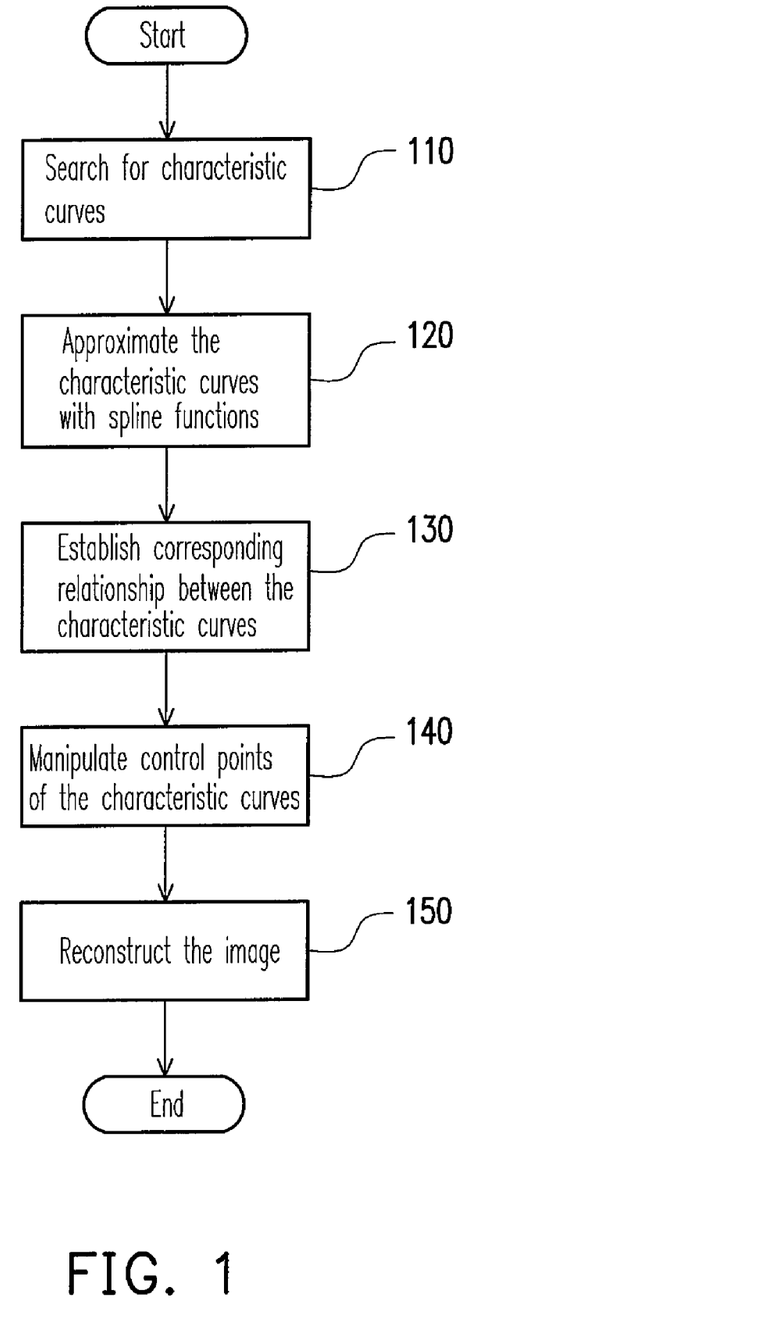
FIG. 1 is a flow chart of a method for image editing according to an embodiment of the present invention.

FIG. 1 is a main flow chart of a method for image editing according to an embodiment of the present invention. Firstly, in step 110, characteristic curve of an image are searched. In case of a color image, the image must be first divided into a plurality of components corresponding to a color space, and then, the characteristic curves are searched for in the components. For example, the above color space can be RGB, HSI, HSV, CIELAB, YUV, YIQ, CMYK, or another color space. For example, RGB has three components of red, green, and blue, which is equivalent to dividing the image into three sub-images; and CMYK has four components of cyan, magenta, yellow, and black, which is equivalent to dividing the image into four sub-images. After the image has been divided according to the components, the characteristic curves are searched in each of the sub-images of various components. In another aspect, in case of a black and white image, only grayscale exists in the image, so the image does not need to be divided, but directly searching for the characteristic curves.

The characteristic curves of this embodiment are edge curves for defining edges of objects in the image. However, the present invention is also applicable for other characteristics definitions.

Figure 2A:
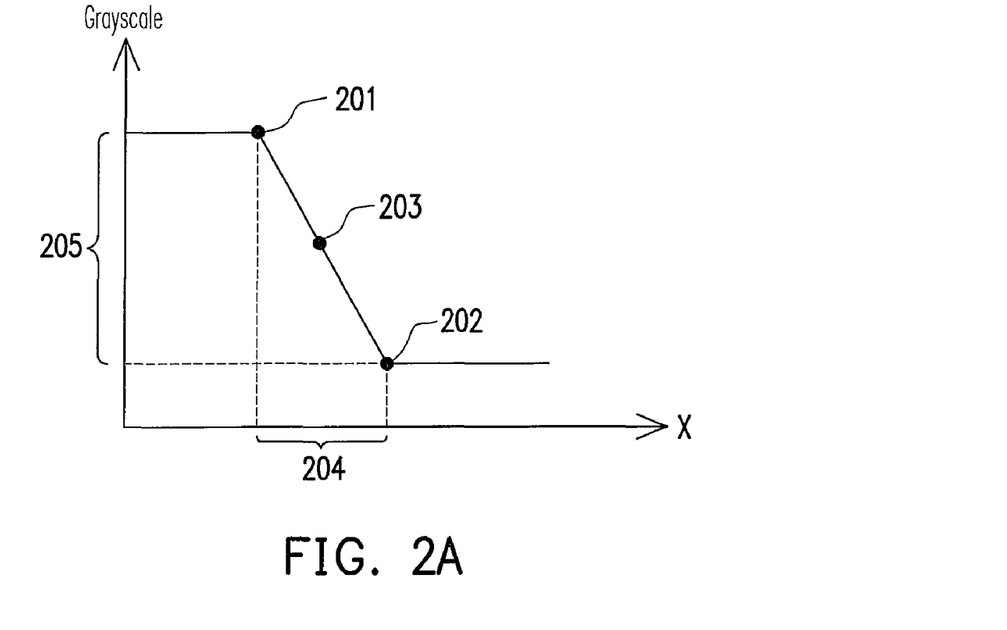
FIGS. 2A and 2B are schematic view of edges of an object according to an embodiment of the present invention.
Figure 2B:
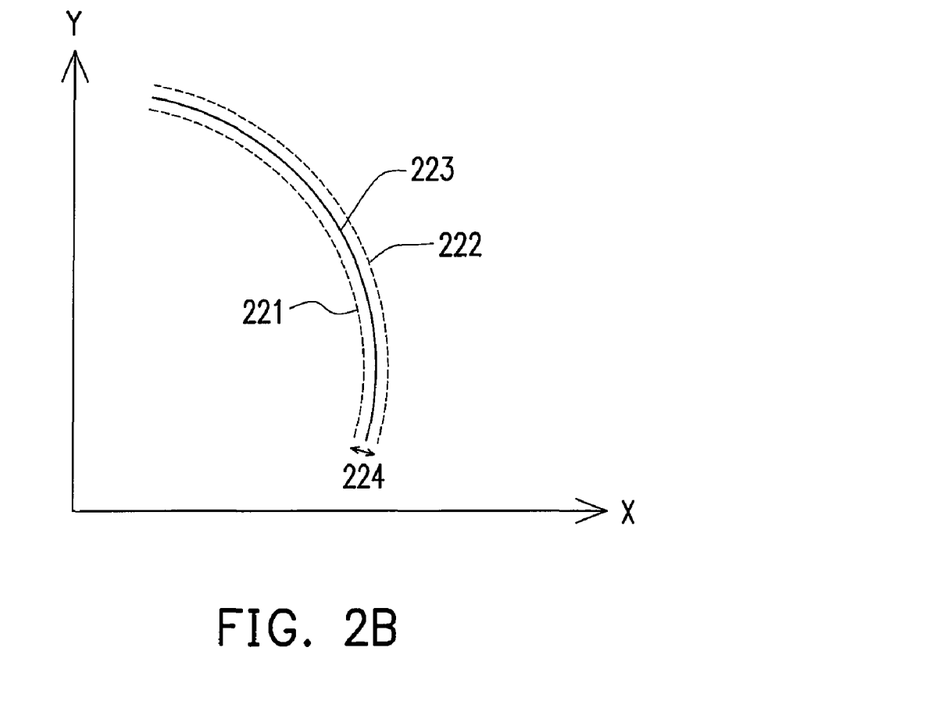

In this embodiment, two processes can be used to search for the characteristic curves, as shown in FIGS. 2A and 2B. The first one is to use edge models to search for the edge curves according to grayscale variations of the image by means of curve fitting, and thereby finding out parameters of each of the edge curves. For example, the parameters of the edge curves include an edge center, an edge width, an edge contrast, an edge length, and the like.

The edges can be defined with high curvature points. Taking a one-dimensional image as an example, FIG. 2A is a grayscale distribution diagram of the one-dimensional image, in which 201 and 202 indicate high curvature points, and 203 at the center indicates the edge center. The so-called high curvature points are positions where the grayscale varies significantly in the image, and an appropriate threshold can be set according to the actual usage requirements. In the example of FIG. 2A, the edge width is a distance 204 between the two high curvature points 201 and 202, and the edge contrast is a grayscale difference 205 between two sides of the edge. The one-dimensional image example can be expanded to a two-dimensional image, as shown in FIG. 2B. The high curvature points on both sides of the edge are extended to form high curvature curves 221 and 222, and the edge center point is also extended to form a midline 223 of the two high curvature curves. In FIG. 2B, the edge width is a distance 224 between the curves 221 and 222, and the edge contrast is a grayscale difference between the curves 221 and 222.

The second process to search for the characteristic curves is to link the high curvature points in the image together to form high curvature curves, e.g., 221 and 222 of FIG. 2B, and to take a midline position of each pair of high curvature curves as a characteristic curve, e.g., 223 of FIG. 2B. As shown in FIG. 2B, high curvature curves appear in pairs, and the pairing relationship can be determined by setting a threshold or other common conditions. The two high curvature curves can be replaced as along as the edge midline and the edge width are stored.

As known from the above illustration that, the edge curves of this embodiment are not merely curves, but edge regions with the parameters of center, width, length, contrast, and the like. These parameters also can be used to edit the image.

After the characteristic curves have been found out, the process enters to step 120, in which the characteristic curves are approximated with spline functions. Herein, any spline function can be used, for example, basis spline (B-spline) or Bezier spline. The smoothness of the spline functions and the number of control points are determined according to the user's maximum tolerable errors. The spline functions are used, which is convenient for the manipulation of the characteristic curves, and if the pixels forming the characteristic curves are manipulated directly, a large number of the pixels is involved, which causes inconveniences in manipulation. The number of the control points of the spline functions is far less than that of the pixels of the characteristic curve, so the manipulation will become much more convenient.

Then, the process enters to step 130, in which the corresponding relationship between the characteristic curves in different components of the color spaces but at the same position is established. Taking RGB as an example, if characteristic curves at the same position are found in at least two components among the three components of red, green, and blue, the corresponding relationship between these characteristic curves is established, and they are regarded as a whole. The purpose of establishing the corresponding relationship will be explained in the next step. If the image is a black and white image, step 130 may be omitted.

When the image needs to be edited, the process enters to step 140, in which the characteristic curves are manipulated through the control points of the corresponding spline functions, for example, the control points can be moved in an XY plane and/or along Z axis. By moving the control points in the XY plane, the shape of an object can be adjusted. By moving the control points along the Z axis, the corresponding image component can be adjusted. As described above, characteristic curves are searched for in all components of the image, so the Z axis is corresponding to the component where the characteristic curve belongs to. Taking HSI color space as an example, if the Z axis is corresponding to the H component, the hue of the object can be changed by moving the control points along the Z axis; if the Z axis is corresponding to the S component, the saturation of the object can be changed by moving the control points along the Z axis; if the Z axis is corresponding to the I component, the intensity of the object can be changed by moving the control points along the Z axis. In this embodiment, the grayscale generally refers to the value of any image component.

Besides moving the control points along a coordinate axis, the manipulation of the characteristic curves further includes deleting or adding the control points.

It should be noted that, if a corresponding relationship between several characteristic curves has been established in step 130, and any one of these characteristic curves is manipulated, the other corresponding characteristic curves having a corresponding relationship with the manipulated characteristic curve must be manipulated automatically in the same way. As the pixel colors in the image are co-determined by all of the components, the corresponding characteristic curves must be manipulated together. If only one of the characteristic curves is manipulated, the image color after the editing will be incorrect.

Then, the process enters to step 150, in which the image is reconstructed according to the manipulated characteristic curves. If any one of characteristic curve extends after the manipulation, new pixels must have been added, besides the original pixels. The method for image editing of this embodiment will generate the grayscale of the newly-added pixels by means of interpolation according to the grayscale of the original pixels. After the grayscale of the edge curves has been determined, according to the grayscale of all characteristic curves of the image, the grayscale of the pixels outside the characteristic curves in the same image is generated by means of interpolation. The image reconstruction process is the interpolation operation, and the result is the edited image.

In the interpolation operation, the color of one pixel is influenced by all nearby characteristic curves. The "nearby" relationship is defined with personal settings depending upon the actual usage requirements. Although the result of the interpolation is only an approximate value, as long as the density of the edge curves is sufficiently high, the difference will be invisible by naked eyes.

Various applications of the method for image editing of this embodiment are illustrated below with reference to the accompanying drawings.

Figure 3A:
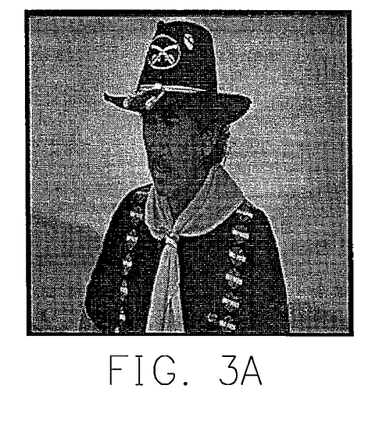
FIGS. 3A-3F, 4A-4B, 5A-5C, 6A-6B, 7A-7C, 8A-8C, 9A-9B, 10A-10C, and 11A-11B show various application examples of a method for image editing according to an embodiment of the present invention.
Figure 3B:
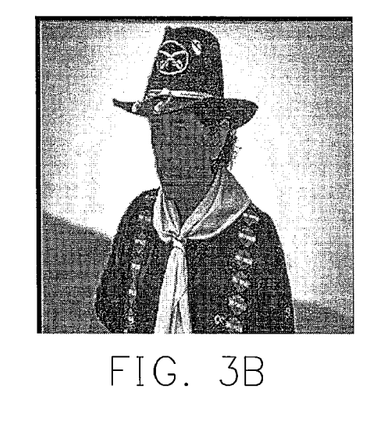
Figure 3C:
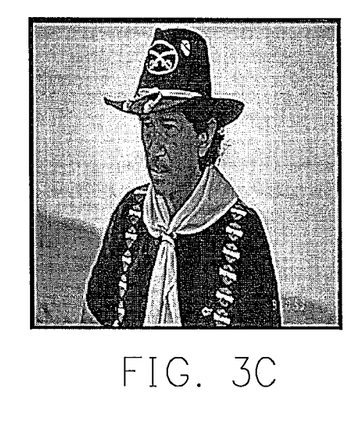
Figure 3D:
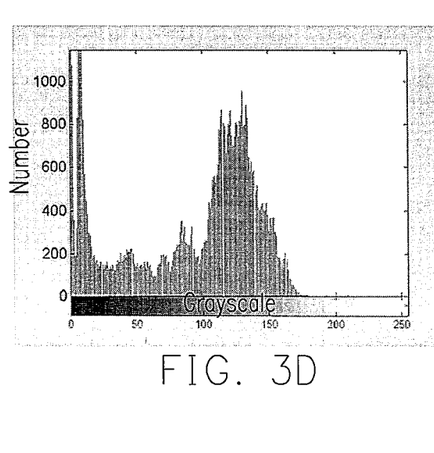
Figure 3E:
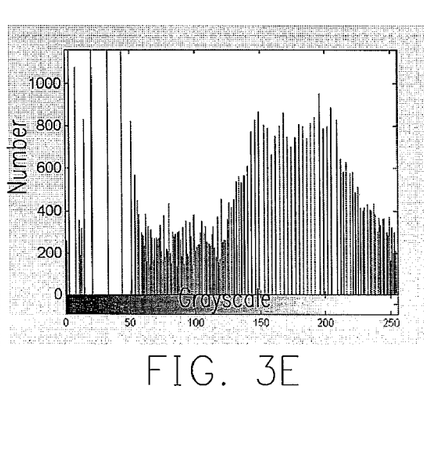
Figure 3F:
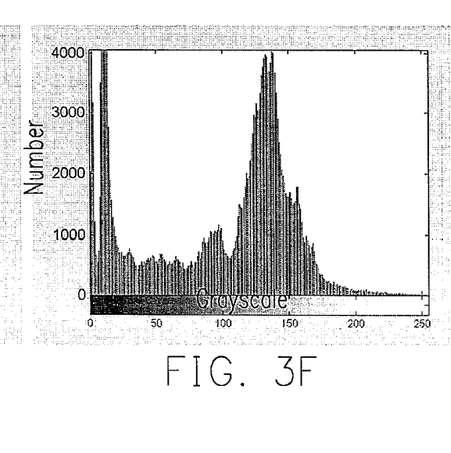

As shown in FIGS. 3A-3F, the method for image editing of this embodiment can edit the image through adjusting the parameters of the characteristic curves. FIGS. 3A-3F show an example to sharpen the image. FIG. 3A shows the original image, and FIG. 3D is a histogram of FIG. 3A. FIG. 3B shows the image of FIG. 3A sharpened by means of the conventional histogram equalization, and FIG. 3E is a histogram of FIG. 3B. FIG. 3C shows the image of FIG. 3A sharpened by enhancing the edge contrast according to the method for image editing of this embodiment, and FIG. 3F is a histogram of FIG. 3C. Through observing FIGS. 3A-3F, for example, observing the facial lines, it is known that, the sharpening effect of the method for image editing of this embodiment is preferred than the conventional art. Besides enhancing the edge contrast, the method for image editing of this embodiment can also realize the sharpening effect by reducing the edge width to intensify the grayscale variation of the edges.

Figure 4A:
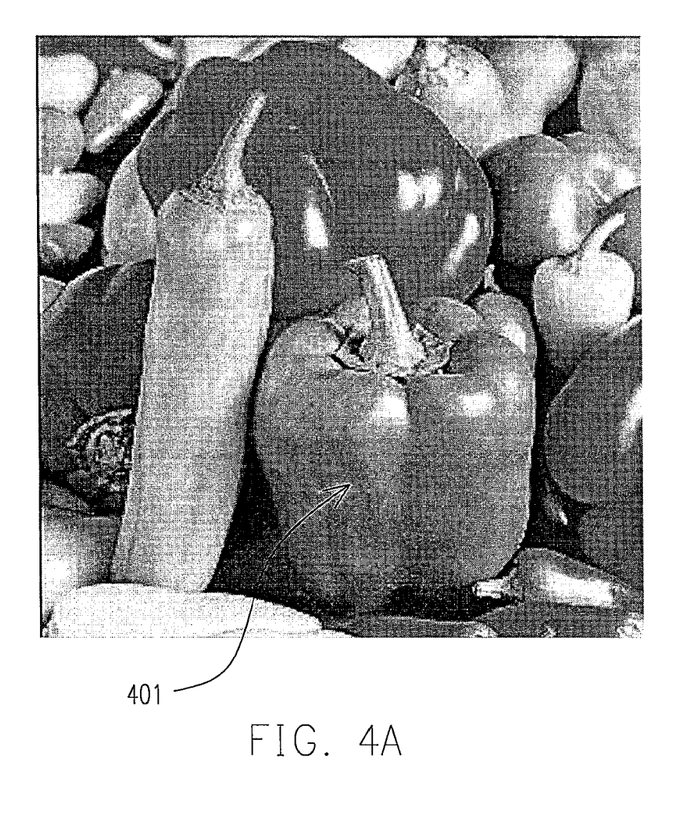
Figure 4B:
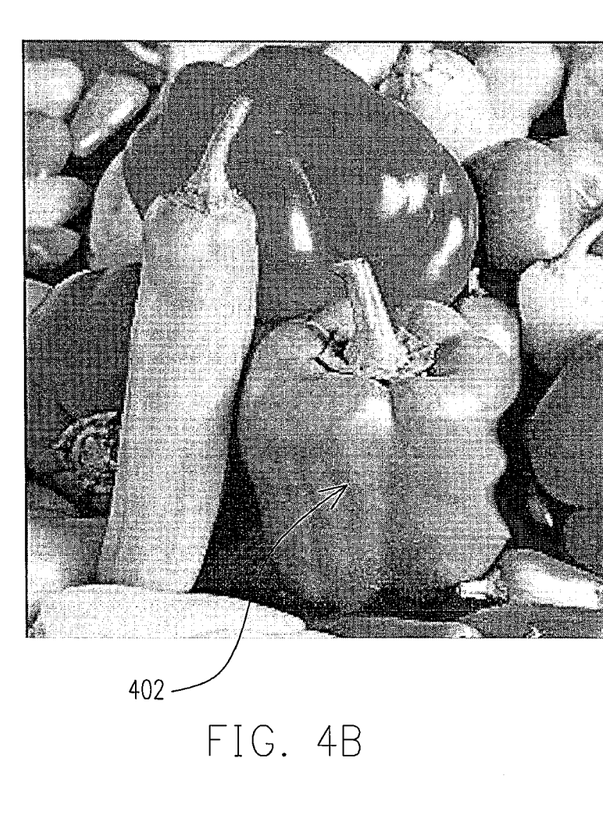

FIGS. 4A and 4B show an example to make an object be deformed by moving the control points of the characteristic curves. The right edge of a sweet pepper 401 of FIG. 4A is almost a straight line. By moving the control points at the right edge, the result as shown in FIG. 4B is obtained, i.e., the right edge of the sweet pepper 402 is changed to a wave line.

Figure 5A:
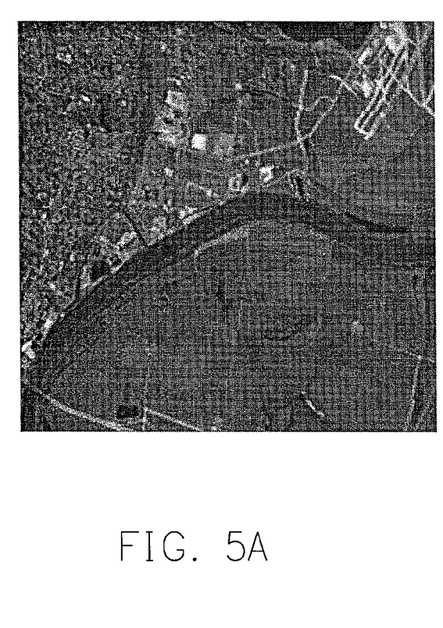
Figure 5B:
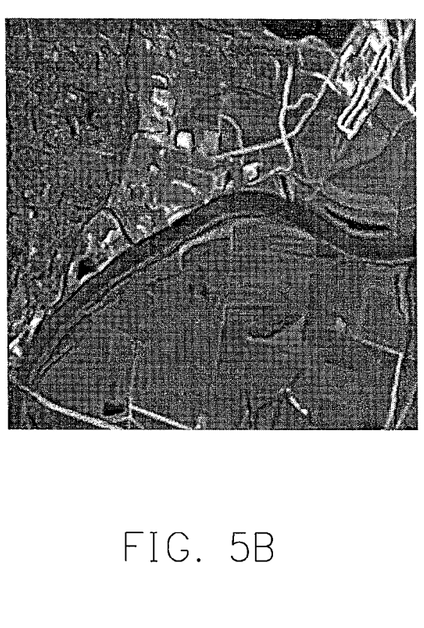
Figure 5C:
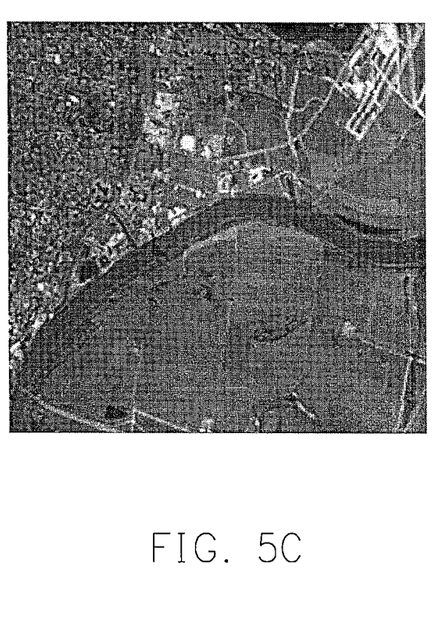

In the method for image editing of this embodiment, the parameters of the characteristic curves can be selected to be adjusted. For example, the parameters of all of the characteristic curves are filtered according to preset conditions, and only the characteristic curves that satisfy the preset conditions are adjusted, as shown in FIGS. 5A and 5C. FIGS. 5A and 5C are air views of scenes, including cities, roads, and fields. FIG. 5A is the original image. If the part of roads in the air view needs to be highlighted, as the edges of the roads are relatively long, the condition can be set to only adjust the characteristic curves with the length larger than a predetermined value, and the result of the adjustment is shown in FIG. 5B. In another aspect, if the part of buildings in the air view needs to be highlighted, as the edges of the roads are relatively short, the conditions can be set to only adjust the characteristic curves with lengths smaller than a predetermined value, and the result of the adjustment is shown in FIG. 5B.

Figure 6A:
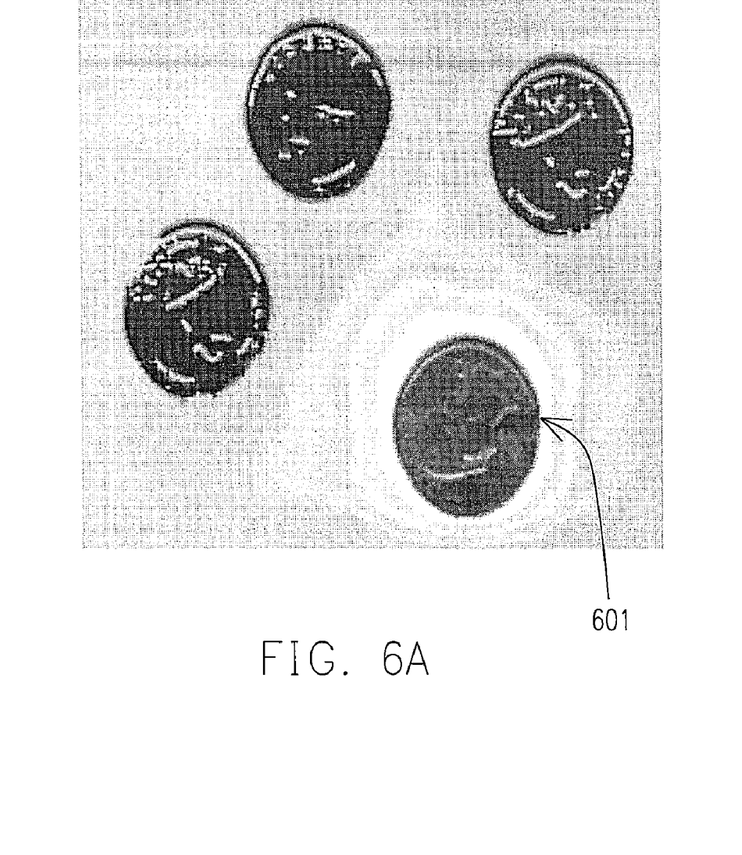
Figure 6B:
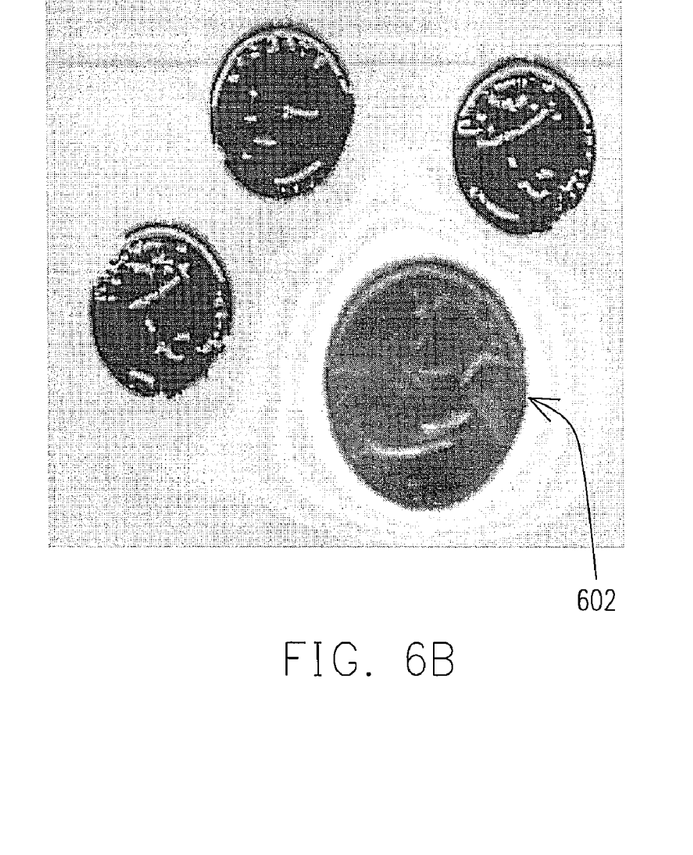

FIGS. 6A and 6B show an example to amplify an object. A coil 602 in FIG. 6B is obtained by amplifying a coil 601 in FIG. 6A. The amplification can be achieved by moving the control points of the characteristic curves.

Figure 7A:
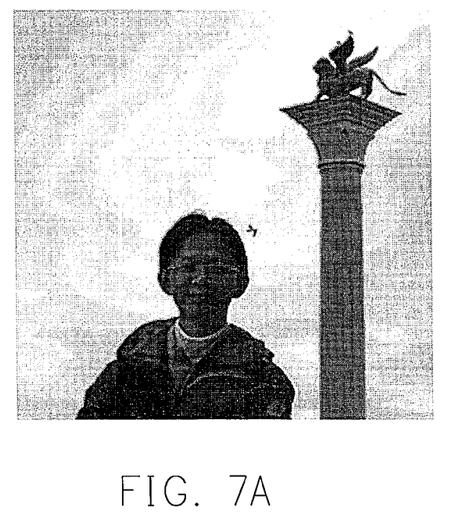
Figure 7B:
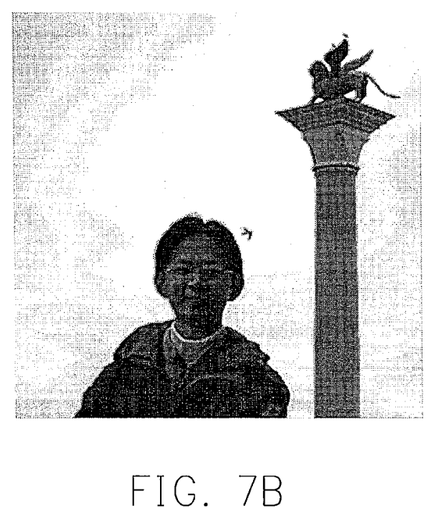
Figure 7C:
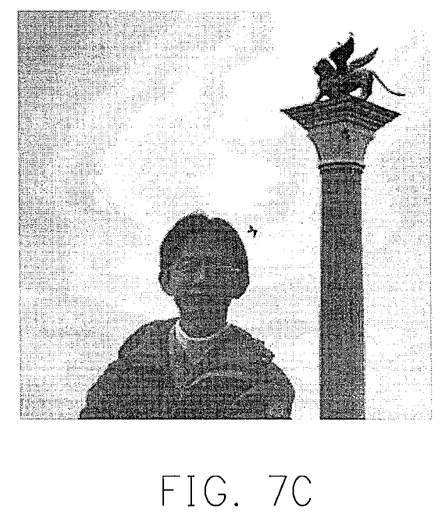

FIGS. 7A-7C show an example of backlight compensation to a character in a photograph. FIG. 7A is the original photo, FIG. 7B shows the result of the backlight compensation to the character in the photo through conventional histogram equalization, and FIG. 7C shows the result of the backlight compensation to the character in the photo through the method for image editing of this embodiment. In this embodiment, all of the characteristic curves of the edges of the character are adjusted to achieve the backlight compensation to the entire character, i.e., only increasing the brightness of the character in the backlight. Comparing FIGS. 7B and 7C, it can be known that, the backlight compensation effect of this embodiment is preferred than that of the conventional art.

Figure 8A:
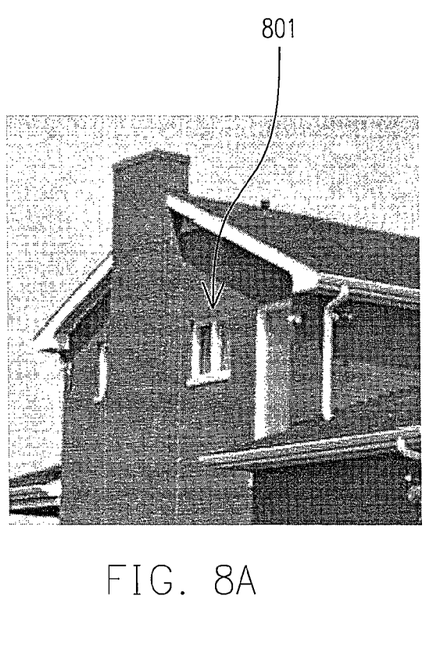
Figure 8B:
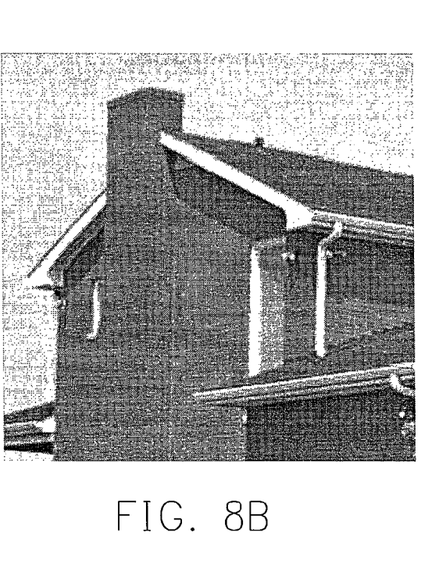
Figure 8C:
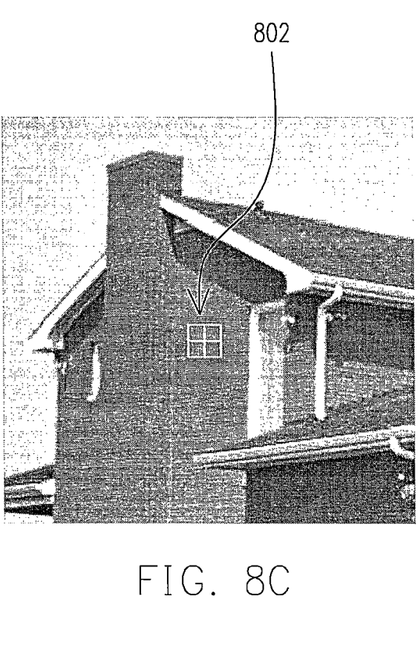

The method for image editing of this embodiment also can be used to edit an image by adding or deleting the characteristic curves, which is illustrated through the example of FIGS. 8A-8C. A window 801 in FIG. 8A will disappear if all of the characteristic curves for defining the window 810 are deleted, as shown in FIG. 8B. Then, by adding the characteristic curves for defining a window, a window 802 appears, as shown in FIG. 8C.

Figure 9A:
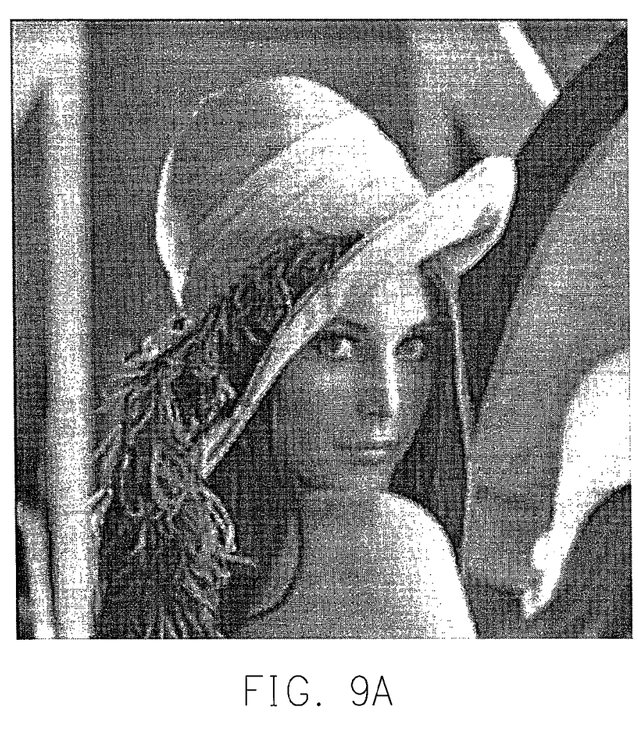
Figure 9B:
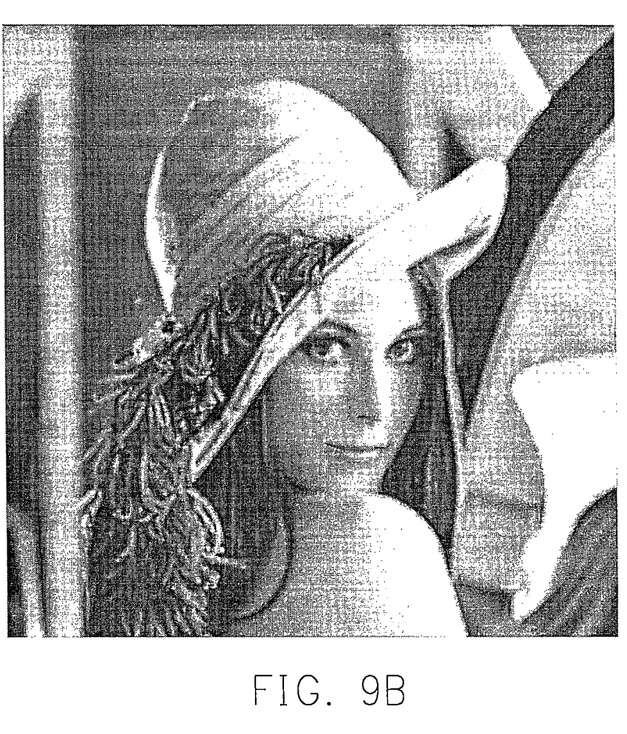

FIGS. 9A and 9B show an example to change an expression in a photo by way of deforming an object, in which the smiling degree of the character in the photo can be changed by moving the control points of the characteristic curves of the lip. Using this method, a series of expressions can be made through only one photo.

Figure 10A:
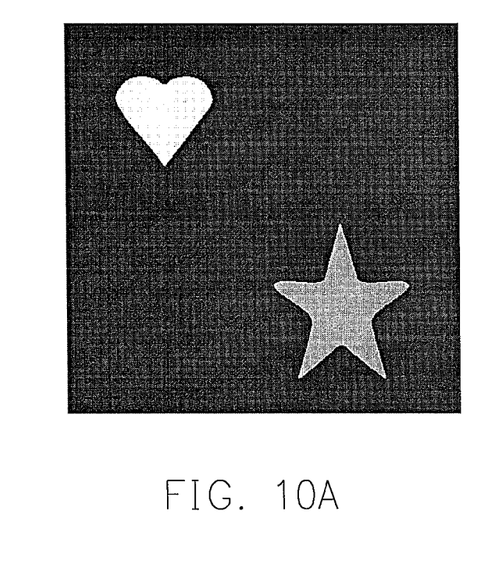
Figure 10B:
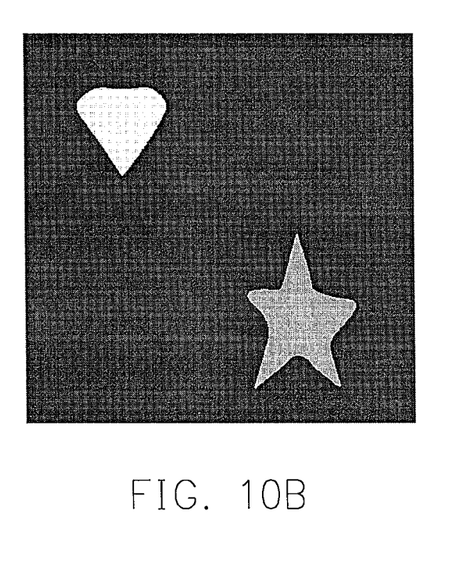
Figure 10C:
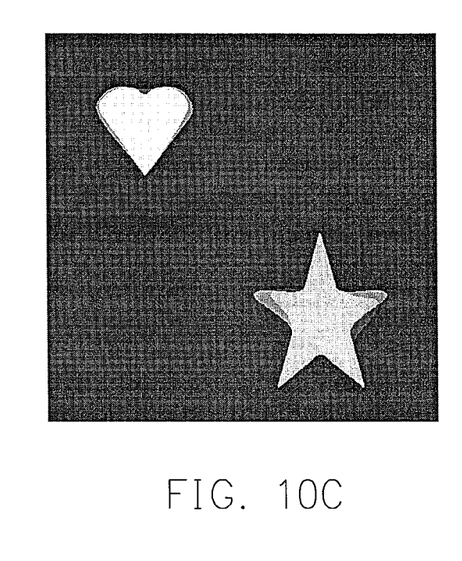

The method for image editing of this embodiment also can be used to edit an image by adding or deleting the control points of the characteristic curves, which is illustrated through the example of FIGS. 10A and 10B. FIG. 10B shows the result of deleting a part of the control points of the object in FIG. 10A. As shown in FIG. 10B, as the control points are reduced, the shapes of the heart-shaped objects and star-shaped objects are milder than those in FIG. 10A. FIG. 10C demonstrates the necessity for establishing the corresponding relationship between the characteristic curves of different components of the color space. The corresponding relationship between the characteristic curves in FIG. 10B has been established, so the changing of the shapes of the objects is correct. However, the corresponding relationship is not established in FIG. 10C, so it can be seen that, incorrect color spots appear at the edges of the heart-shaped objects and the star-shaped objects.

Figure 11A:
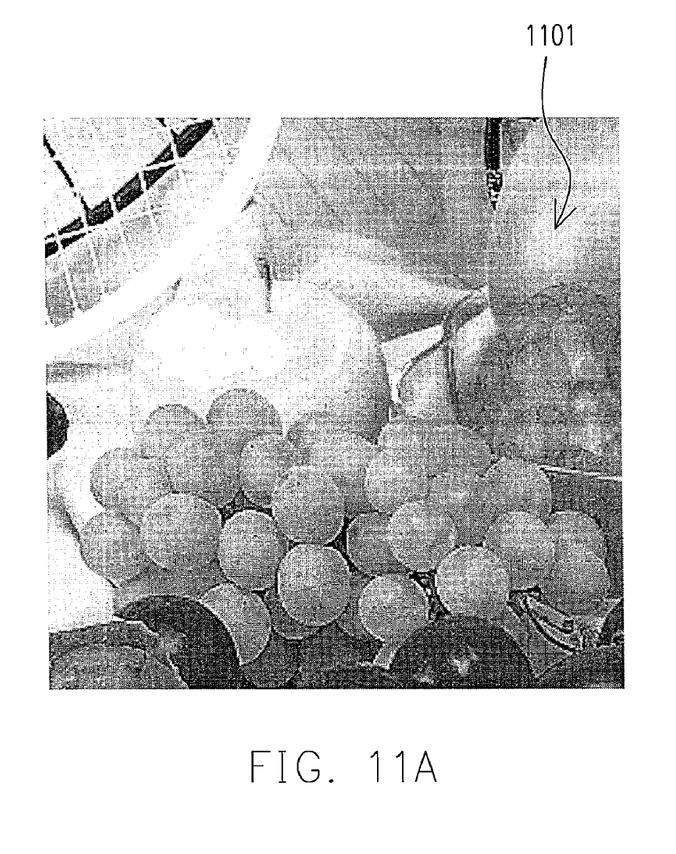
Figure 11B:
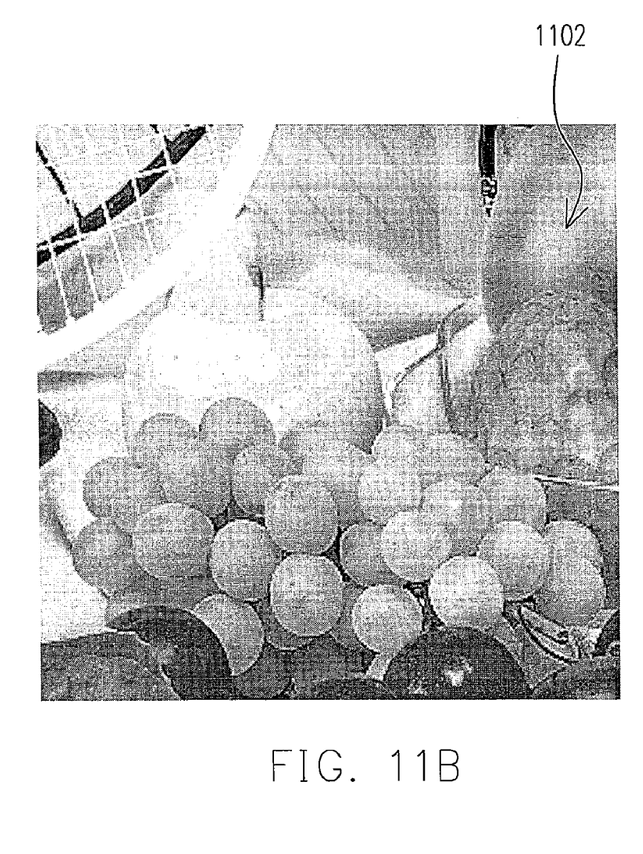

FIGS. 11A and 11B show an example of varying the color of an object. The color of an object 1101 in FIG. 11A is different from that of an object 1102 in FIG. 1B, which is achieved by moving the control points along the Z axis. In this example, the Z axis is corresponding to the H (hue) component of the HSI color space. As the color of the edges is changed, the colors of the pixels in the object generated by the interpolation operation will be changed accordingly.

Figure 12:
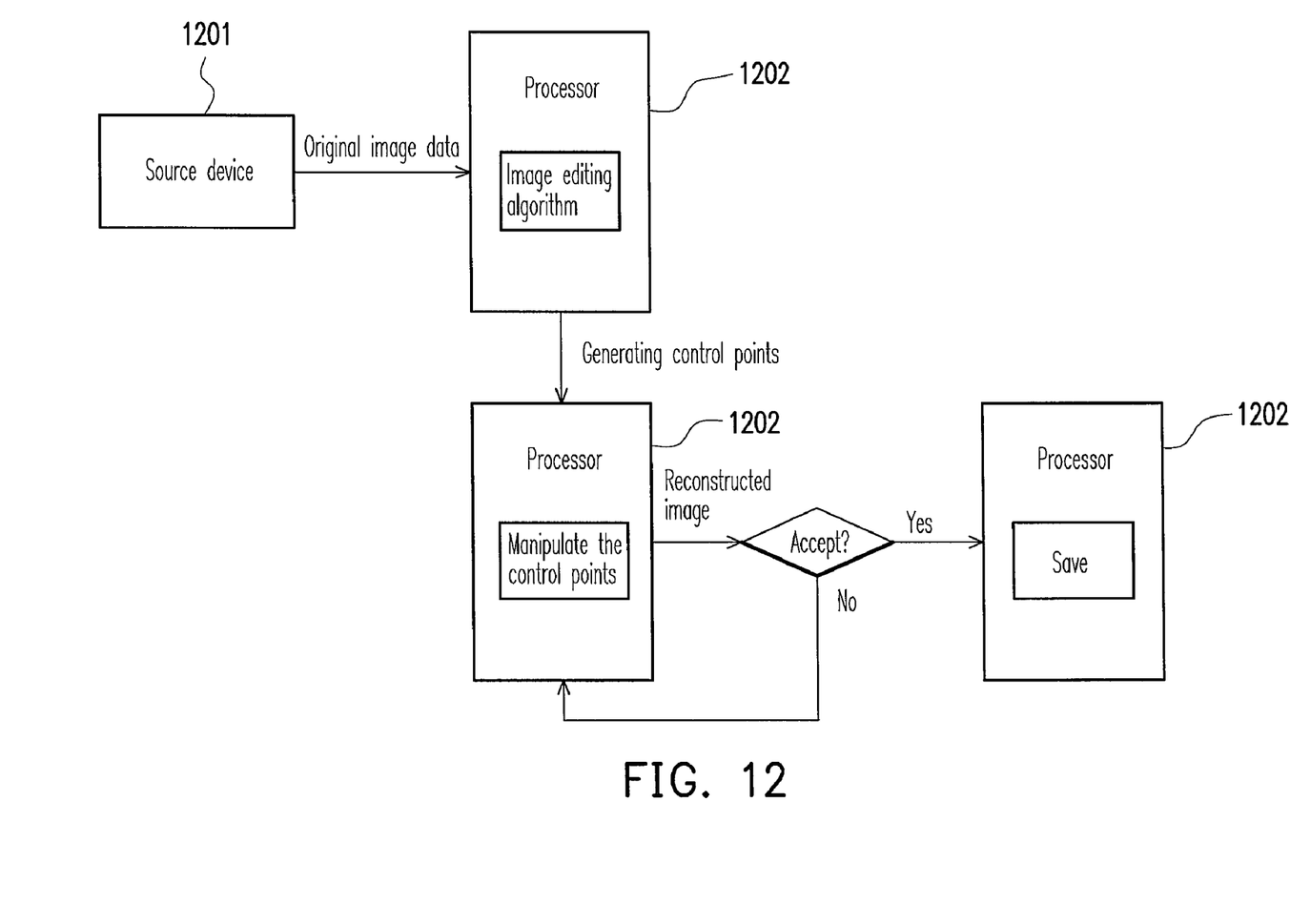
FIG. 12 is a schematic view of a system for image editing according to an embodiment of the present invention.

Besides the method for image editing, the present invention further includes a corresponding system for image editing. FIG. 12 is a schematic of a system for image editing according to an embodiment of the present invention. The system for image editing of FIG. 12 includes a source device 1201 and a processor 1202. Actually, three processors 1202 of FIG. 12 are actually the same one, and three processors are shown only for the convenience of illustration.

The source device 1201 provides original image data of an image. The source device 1201 can be a storage device such as a memory or a hard disk, or an image capturing device such as a video camera. The processor 1202 is coupled to the source device 1201 to receive the image data. The processor 1202 performs an image editing algorithm, which has the same process as the method for image editing of the above embodiment, and it is briefly illustrated as follows.

The processor 1202 searches for characteristic curves of an image through an edge model or according to high curvature points, approximates the characteristic curves through spline functions, and generates control points of the spline functions. In case of a color image, the processor 1202 establishes corresponding relationship between characteristic curves in different components of a color space but at the same position. Then, the processor 1202 manipulates the characteristic curves through the control points of the spline functions or adjusts parameters of the characteristic curves depending upon a user's an operation or command, and then, reconstructs the image through the manipulated characteristic curves. If the user is not satisfied with the reconstructed image, the user can continuously give a command to manipulate the characteristic curves and reconstruct the image until the user is satisfied. Upon knowing that the user is satisfied, the processor 1202 performs an output motion, e.g., saves the image. The technical details for the processor 102 to perform the algorithm of image editing have been illustrated in detail in the above embodiment of the method for image editing, which thus will not be repeated herein.

To sum up, the method and system for image editing of the above embodiment can easily manipulate the objects in an image by manipulating the control points of the spline functions and adjusting parameters of the characteristic curves. The above method and system are not only easy for being automated, but also have extensive application elasticity. For example, the above method and system can adjust all of the characteristic curves in the image for once, or selectively adjust a part of the characteristic curves, or edit the area surrounded by the characteristic curves by manipulating the characteristic curves, or change the shape, size, or color of the objects, or soften or sharpen the edges of the objects by reducing or adding the control points, or delete or add the edges of the objects, or achieve the backlight compensation of photos.

It will be apparent to persons of ordinary art in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for image editing, applicable to a system for image editing comprising a source device and a processor, wherein the method is executed by the processor and comprises:
   (a) the processor dividing a color image provided by the source device into a plurality of components corresponding to a color space;
   (b) the processor searching for characteristic curves in each of the components of the color image;
   (c) the processor establishing corresponding relationship among the characteristic curves in different components of the color image but at a same position;
   (d) the processor approximating the characteristic curves with spline functions;
   (e) the processor manipulating at least one of the characteristic curves through control points of the corresponding spline functions;
   (f) the processor manipulating the characteristic curves having a corresponding relationship with the manipulated characteristic curve in the same way; and
   (g) the processor reconstructing the color image according to the characteristic curves of the color image.

2. The method for image editing as claimed in claim 1, wherein the characteristic curves are edge curves for defining edges of objects of the color image, and step (b) comprises the processor using an edge model to search for the edge curves according to grayscale variations of the color image by means of curve fitting, and thereby finding out parameters of each of the edge curves.

3. The method for image editing as claimed in claim 2, wherein the parameters comprise at least one of an edge center, an edge width, an edge contrast, and an edge length.

4. The method for image editing as claimed in claim 2, further comprising the processor adjusting at least one parameter of at least one of the edge curves between step (c) and step (f).

5. The method for image editing as claimed in claim 4, wherein the adjusted edge curve is the one with parameters meeting a preset requirement among all of the edge curves of the color image.

6. The method for image editing as claimed in claim 1, wherein step (b) comprises the processor searching for the characteristic curves according to high curvature points of grayscale of the color image.

7. The method for image editing as claimed in claim 6, wherein step (b) comprises:
   the processor linking the high curvature points to form at least a pair of high curvature curves; and
   the processor taking a midline position of each pair of the high curvature curves as the characteristic curves.

8. A system for image editing, comprising:
   a source device, for providing original image data of a color image; and
   a processor, coupled to the source device, dividing the color image into a plurality of components corresponding to a color space, searching for characteristic curves in each of the components of the color image, establishing corresponding relationship among the characteristic curves in different components of the color image but at a same position, approximating the characteristic curves with spline functions, manipulating at least one of the characteristic curves through control points of the corresponding spline functions, manipulating the characteristic curves having a corresponding relationship with the manipulated characteristic curve in the same way, and then, reconstructing the color image according to the characteristic curves of the color image.

9. The system for image editing as claimed in claim 8, wherein the characteristic curves are edge curves for defining edges of objects in the color image, and the processor uses an edge model to search for the edge curves according to grayscale variations of the color image by means of curve fitting, and thereby finding out parameters of each of the edge curves.

10. The system for image editing as claimed in claim 9, wherein the processor adjusts at least one parameter of at least one of the edge curves before reconstructing the image.

11. The system for image editing as claimed in claim 8, wherein the characteristic curves are edge curves for defining edges of objects in the color image, and the processor searches for the characteristic curves according to high curvature points of grayscale of the color image.

* * * * *